(12) United States Patent
Walker et al.

(10) Patent No.: US 7,690,164 B2
(45) Date of Patent: Apr. 6, 2010

(54) SYSTEM, METHOD, AND APPARATUS FOR STRUCTURAL LUG FORMED FROM A COMBINATION OF METAL AND COMPOSITE LAMINATE MATERIALS

(75) Inventors: Jared T. Walker, Marietta, GA (US); John E. Barnes, Roswell, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 369 days.

(21) Appl. No.: 11/633,903

(22) Filed: Dec. 5, 2006

(65) Prior Publication Data

US 2008/0131656 A1   Jun. 5, 2008

(51) Int. Cl.
*E04C 1/00* (2006.01)
(52) U.S. Cl. .................... 52/309.1; 248/674; 248/637
(58) Field of Classification Search ............... 52/166, 52/125.2, 309.1, 698; 248/674, 680, 500, 248/200, 637, 557; 114/230.1; 428/119, 428/120; 244/17.27; 238/58, 67, 319
See application file for complete search history.

(56) References Cited

U.S. PATENT DOCUMENTS

| | | | | |
|---|---|---|---|---|
| 3,349,157 | A | * 10/1967 | Parsons | 264/255 |
| 4,109,435 | A | * 8/1978 | Loyd | 52/309.1 |
| 4,113,910 | A | 9/1978 | Loyd | |
| 4,222,280 | A | 9/1980 | Stewart | |
| 4,256,790 | A | * 3/1981 | Lackman et al. | 428/73 |
| 4,331,495 | A | * 5/1982 | Lackman et al. | 156/93 |
| 4,489,123 | A | * 12/1984 | Schijve et al. | 428/213 |
| 4,500,589 | A | * 2/1985 | Schijve et al. | 428/213 |
| 4,757,658 | A | * 7/1988 | Kaempen | 52/309.16 |
| 4,992,323 | A | * 2/1991 | Vogelesang et al. | 428/215 |
| 5,024,874 | A | 6/1991 | Yasui et al. | |
| 5,039,571 | A | * 8/1991 | Vogelesang et al. | 428/213 |
| 5,092,538 | A | * 3/1992 | Denney | 244/54 |
| 5,130,188 | A | 7/1992 | Anahara et al. | |
| 5,173,358 | A | 12/1992 | Anahara et al. | |
| 5,303,896 | A | 4/1994 | Sterka | |
| 5,429,853 | A | * 7/1995 | Darrieux | 428/102 |
| 5,460,317 | A | * 10/1995 | Thomas et al. | 228/112.1 |
| 6,105,944 | A | 8/2000 | David | |
| 6,109,638 | A | * 8/2000 | Colegrove | 280/288.3 |
| 6,283,168 | B1 | 9/2001 | Gu et al. | |
| 6,374,570 | B1 | * 4/2002 | McKague, Jr. | 52/762 |
| 6,460,240 | B1 | * 10/2002 | Kielies et al. | 29/469.5 |
| 6,513,753 | B1 | 2/2003 | Toni et al. | |
| 6,648,273 | B2 | 11/2003 | Anast | |
| 6,718,713 | B2 | * 4/2004 | McKague et al. | 52/309.13 |

(Continued)

*Primary Examiner*—Brian E Glessner
*Assistant Examiner*—Joshua Ihezie
(74) *Attorney, Agent, or Firm*—Bracewell & Giuliani LLP

(57) ABSTRACT

A structural lug comprising a metallic base, composite middle layers, and outer layers of metallic material is disclosed. The metallic base of the structure is machined to accommodate the composite plies, which are located on each lateral side of the base and bonded to the base with adhesive. The composite material may comprise an adhesive-based resin with embedded fibers. The metallic base may be formed to minimize peel stresses in the composite layers. The top metallic layers are fitted over and bonded to the composite plies and act as the outermost layers of the lug. The lateral ends of the lug where the top layers come into contact with the machined base may be joined together with friction stir welding or mechanical fasteners to form the completed structure.

11 Claims, 5 Drawing Sheets

U.S. PATENT DOCUMENTS

| | | |
|---|---|---|
| 6,877,710 B2 * | 4/2005 | Miyahara et al. ............ 248/637 |
| 7,175,149 B2 * | 2/2007 | Gallien ....................... 248/500 |
| 7,192,501 B2 * | 3/2007 | Westre et al. ............... 156/219 |
| 7,244,487 B2 * | 7/2007 | Brantley et al. ............. 428/119 |
| 2005/0072896 A1 * | 4/2005 | Colgrove et al. ............ 248/637 |

* cited by examiner

SYSTEM, METHOD, AND APPARATUS FOR STRUCTURAL LUG FORMED FROM A COMBINATION OF METAL AND COMPOSITE LAMINATE MATERIALS

BACKGROUND OF THE INVENTION

1. Technical Field

The present invention relates in general to structural anchors and, in particular, to an improved system, method, and apparatus for a structural lug formed from multiple dissimilar materials such as metals and composite laminates.

2. Description of the Related Art

In the prior art, structural anchoring connectors known as "lugs" are very common and important structures in the aerospace and other industries. Lugs are used as a means of connecting two or more structures and act as primary load paths for the underlying structures. Lugs formed from metallic materials such as alloys are the most common and are widely used for many types of applications. Lugs formed from entirely from non-metallic materials (e.g., composite materials) have become increasingly common as well for other types of applications.

Unfortunately, lugs formed from both types of materials have some disadvantages. Metallic lugs are heavy and are subject to fatigue cracking. Typically, variables such as damage tolerance are used to determine the size of a lug for a given application. In addition, metallic components must be large enough to sustain cyclical loading over their lifetime.

The newer, all-composite lugs usually do not have the same issues with fatigue and fatigue cracks as metallic lugs. However, the primary concern with non-metallic lugs is with the ultimate failure mode of a composite structure. For example, composites typically have a brittle failure mode. This means that if a composite lug suffers a large enough crack it will fail catastrophically very quickly. In contrast, a metallic lug has a more ductile failure that may be prolonged before complete failure. Thus, an improved lug solution that combines the best features of both metallic and composite materials into a single structure would be desirable.

SUMMARY OF THE INVENTION

One embodiment of a system, method, and apparatus for a multi-material lug structure is disclosed. The lug comprises three primary parts: a metallic base, composite middle layers, and top or outer plies of metallic material. The metallic base of the structure is machined to accommodate the composite plies, which are located on each lateral side of the base and bonded to the base with adhesive. The composite material may comprise an adhesive-based resin with embedded fibers that also may act as the bond with the metallic parts in lieu of a separate adhesive layer.

In one embodiment, the metallic base may incorporate an integrally machined chamfer to minimize peel stresses in the composite layers. The top metallic layers are fitted over and bonded to the composite plies and act as the outermost layers of the lug. In one embodiment, the lateral ends of the lug where the top layers come into contact with the machined base may be joined to the base with friction stir welding (FSW), mechanical fasteners (e.g., bolts), etc., to form the completed, sandwich-like structure. Another feature of the invention is that the metallic base and metallic outer plies act as a pre-formed mold for the composite plies and, thus, eliminate the need for additional tooling when curing the structure.

The invention is lighter in weight than a comparable all-metal lug, but has a safer, more damage-tolerant failure mode than a purely composite design. The reduction in weight helps reduce the overall weight of the underlying structure to which the lug is secured. Also, having a more damage tolerant structure and a more predictable mode of failure in lugs is important for many applications including aircraft. This solution also provides an efficient design that is easily attached to other objects.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
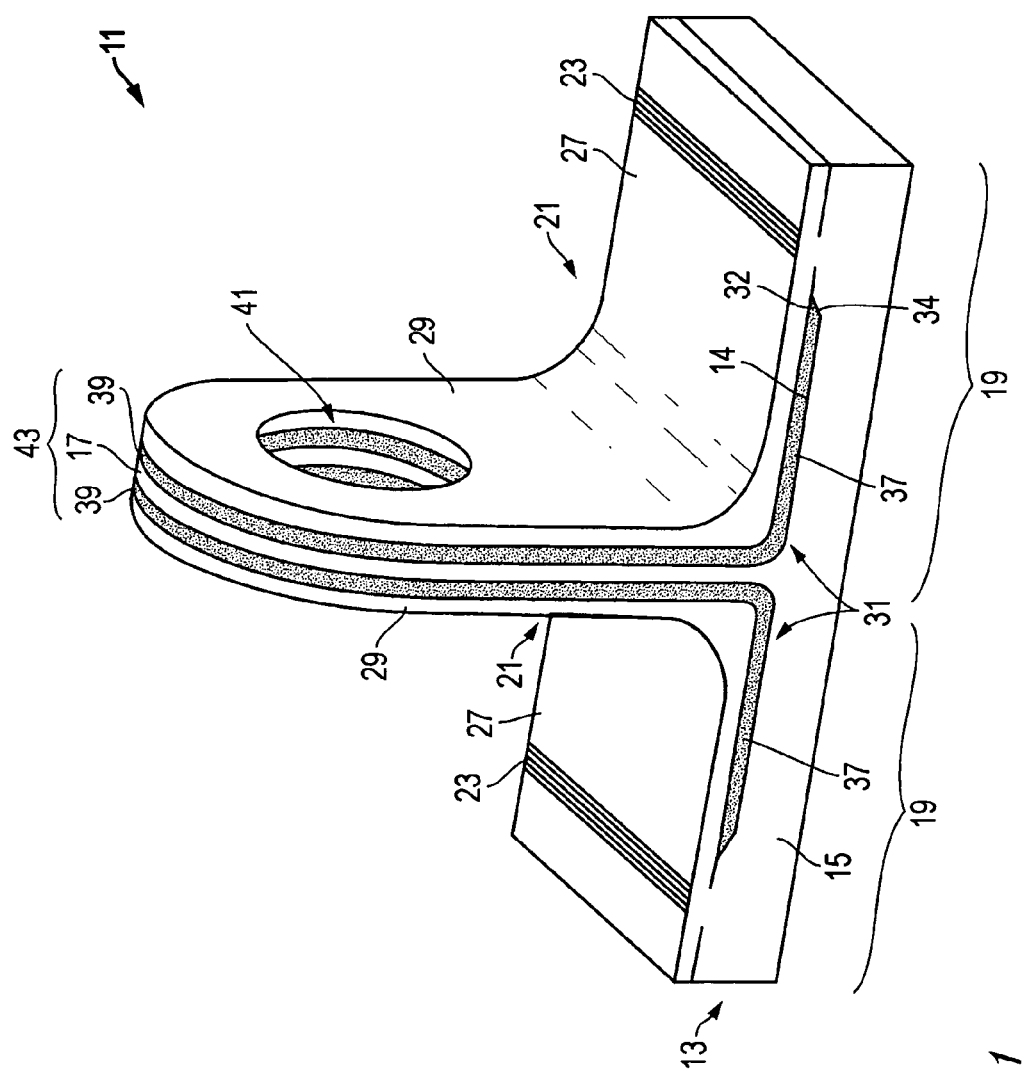
FIG. 1 is an isometric view of one embodiment of a lug constructed in accordance with the present invention.
Figure 2:
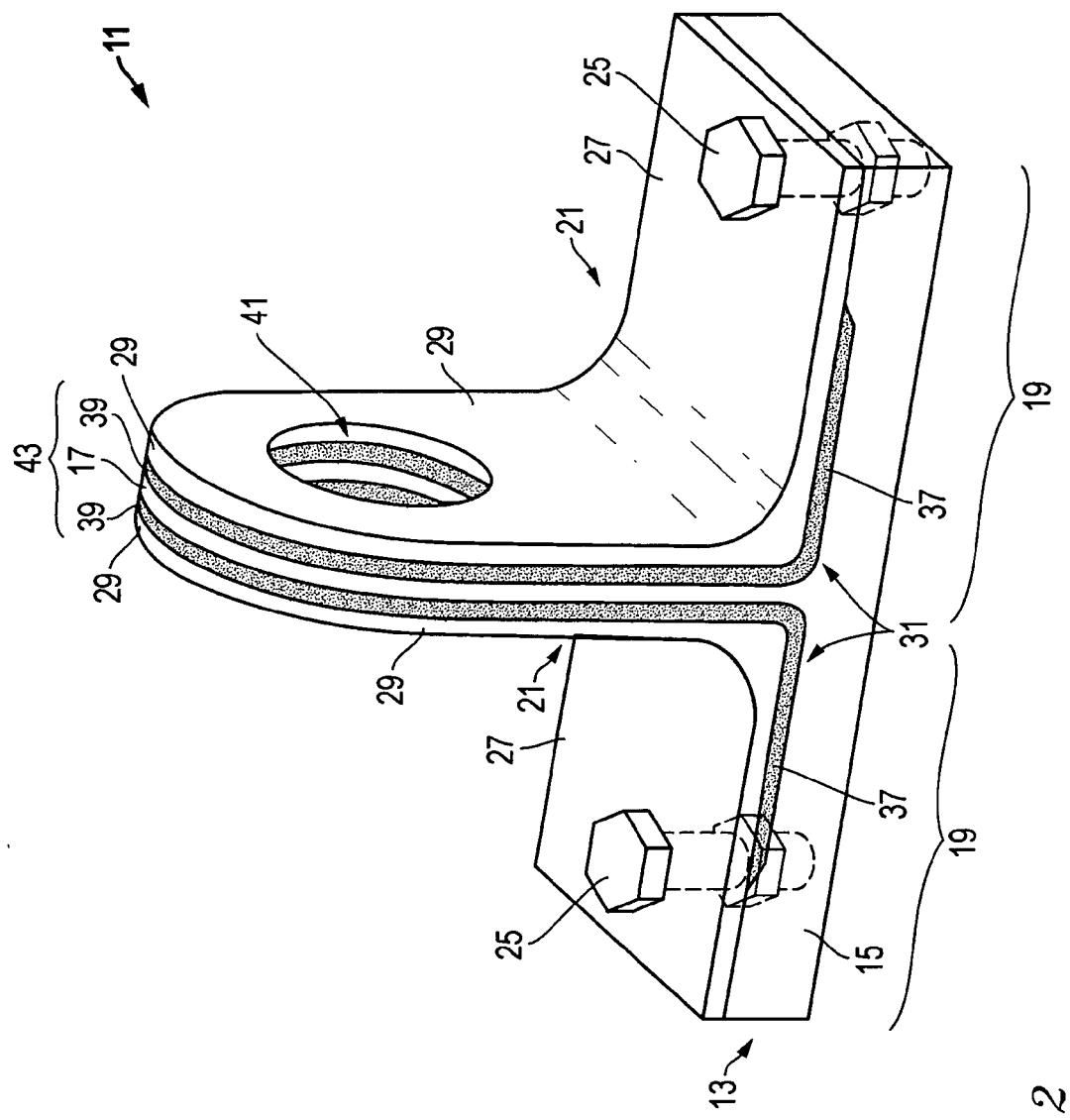
FIG. 2 is an isometric view of another embodiment of a lug constructed in accordance with the present invention.
Figure 3:
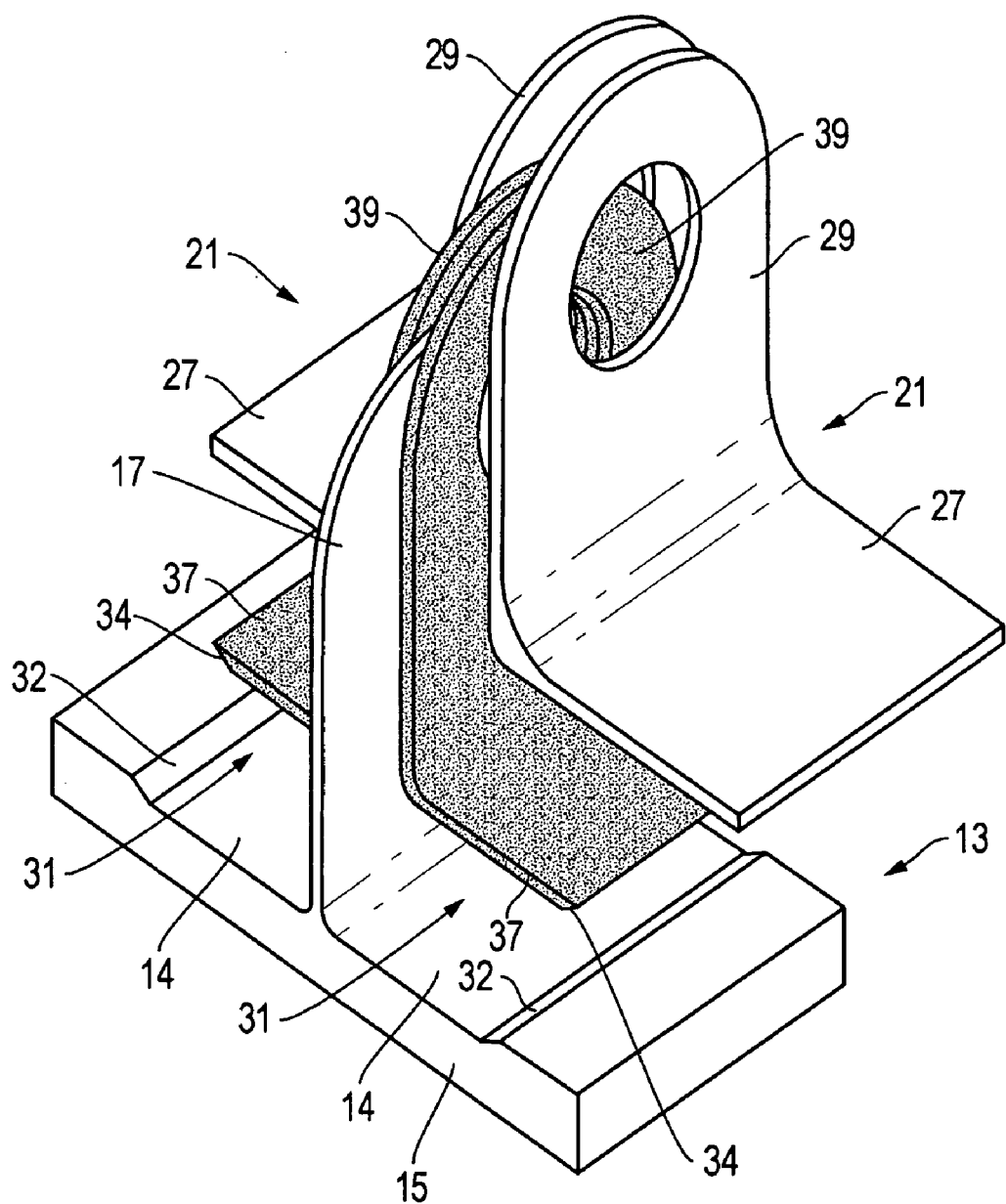
FIG. 3 is an exploded isometric view of the components of a lug prior to assembly and is constructed in accordance with the present invention.
Figure 4:
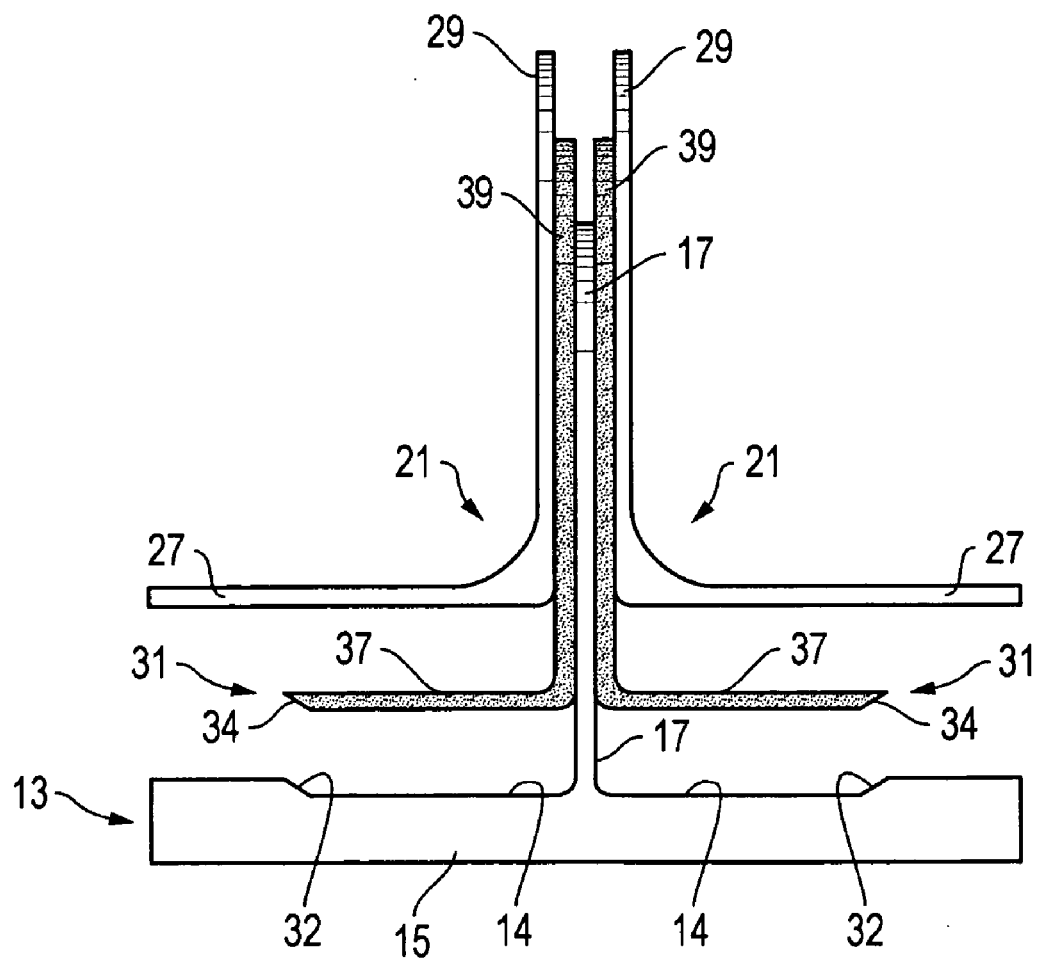
FIG. 4 is an exploded end view of the components of FIG. 3 and is constructed in accordance with the present invention.

Referring to FIGS. 1-5, embodiments of a system, method, and apparatus for a structural lug are shown. As shown in FIGS. 1-4, one embodiment of the structural lug 11 comprises a foundation 13 formed from a metallic material (e.g., metal, metal alloy, etc.). The foundation 13 has a base 15 and a tongue 17 extending from the base 15. In the illustrated embodiment, the tongue 17 extends perpendicularly from a central portion of the base 15 to bifurcate the foundation 13 into two lateral portions 19.

The lug 11 also comprises outer plies 21 that are formed from a metallic material and secured to the foundation 13. The outer plies 21 may be friction stir welded 23 (FIG. 1) to the foundation 13, secured to the foundation 13 with mechanical fasteners 25 (FIG. 2), or joined thereto via other means. The outer plies 21 may comprise a pair of L-shaped outer plies having base portions 27 and tongue portions 29.

A third major component of lug 11 is intermediate plies 31. Intermediate plies 31 are formed from a composite material comprising, for example, an adhesive-based resin with embedded fibers. The intermediate plies 31 are located between the foundation 13 and the outer plies 21. The intermediate plies 31 may be bonded to the base 15 and the tongue 17 with separate adhesive layers. The composite material 31 also may act as the bond (i.e., self-bond) with the metallic parts 13, 21 in lieu of separate adhesive layers. In one embodiment, the outer plies 21 are fitted over and bonded to the intermediate plies 31 to form outermost layers of the lug 11.

An aperture 41 is formed in and extends cylindrically and coaxially through the flange 43 formed by tongue 17 of the foundation 13 and upper portions 29, 39 of the outer plies 21 and the intermediate plies 31, respectively.

In one embodiment, the foundation 13 is machined to accommodate the intermediate plies 31. In addition, surfaces of the foundation 13 may be formed incorporate an integrally machined chamfer to minimize peel stresses in the composite material. Pockets 14 may be formed in the foundation 13 to accommodate the intermediate plies 31. Each of the pockets 14 and respective ones of the intermediate plies 31 have complementary chamfers 32, 34 to minimize peel stresses in the composite material. The complementary chamfers 32, 34 may extend completely across the intermediate plies 31 and the pockets 14 in a direction parallel to the tongue 17.

In one example, the intermediate plies 31 may comprise a pair of intermediate plies having base portions 37 and tongue portions 39, with the intermediate plies 31 being located between the foundation 13 and respective ones of the outer plies 21 on opposite lateral sides of the tongue 17. The outer plies 21 may be secured to distal ends of the two lateral portions 19 beyond the intermediate plies 31. In one embodiment, the metallic foundation 13 and outer plies 21 act as a pre-formed mold for the intermediate plies 31 and, thus, eliminate the need for additional tooling when curing the structure. The lug 11 itself may be secured to an underlying structure via bonding to the lower surface of base 15, or with mechanical fasteners installed, for example, between friction stir welds 23 and the flange 43.

Figure 5:
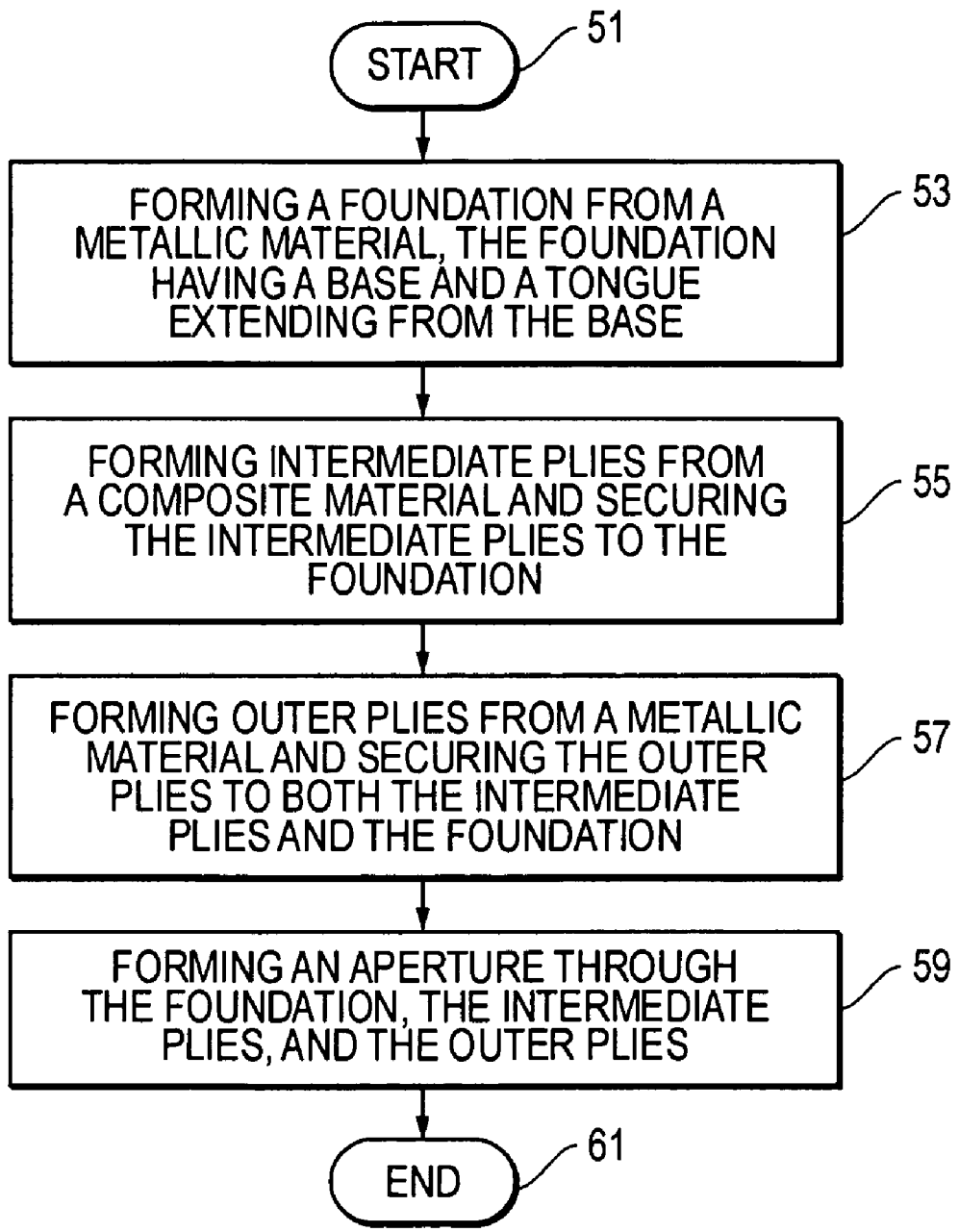
FIG. 5 is a high level flow diagram of one embodiment of method in accordance with the present invention.

Referring now to FIG. 5, the invention also comprises a method of forming a structural member such as a lug. The method begins as indicated at step 51 and, in one embodiment, comprises forming a foundation from a metallic material, the foundation having a base and a tongue extending from the base (step 53); forming intermediate plies from a composite material and securing the intermediate plies to the foundation (step 55); forming outer plies from a metallic material and securing the outer plies to both the intermediate plies and the foundation (step 57); and (optionally) forming an aperture through the foundation, the intermediate plies, and the outer plies (step 59); before ending as indicated at step 61.

The method may further comprise machining the foundation to accommodate the intermediate plies, and forming surfaces of the foundation by machining a chamfer therein to minimize peel stresses in the composite material. As described above, the outer plies may comprise a pair of L-shaped outer plies, the intermediate plies comprise a pair of intermediate plies, and the method includes locating the intermediate plies between the tongue of the foundation and respective ones of the outer plies on opposite lateral sides of the tongue. In another embodiment, the method comprises bonding the intermediate plies to the base and the tongue with adhesive, and bonding the outer plies to the intermediate plies to form outermost layers of the lug.

In an alternate embodiment, the method comprises forming the tongue to extend perpendicularly from a central portion of the base to bifurcate the foundation into two lateral portions, and securing the outer plies to distal ends, of the two lateral portions beyond the intermediate plies. Step 57 may comprise friction stir welding the outer plies to the foundation, or securing the outer plies to the foundation with mechanical fasteners installed in multiple (e.g., two) locations between the chamfers 32, 34 and lateral distal ends of the outer plies 21 and the base 13.

While the invention has been shown or described in only some of its forms, it should be apparent to those skilled in the art that it is not so limited, but is susceptible to various changes without departing from the scope of the invention.

What is claimed is:

1. A structural member, comprising:
    a foundation formed from a metallic material and having a base and a tongue extending perpendicularly from a central portion of the base to bifurcate the base into two lateral portions;
    outer plies formed from a metallic material and secured to the foundation; and
    intermediate plies formed from a composite material and located between the foundation and the outer plies, such that the outer plies are secured to the foundation only at distal ends of the two lateral portions of the base beyond the intermediate plies;
    wherein pockets are formed in the foundation to accommodate the intermediate plies such that base portions of the intermediate plies are flush with the base, and each of the pockets and respective ones of the intermediate plies have complementary chamfers to minimize peel stresses in the composite material.

2. A structural member according to claim 1, wherein the outer plies comprise a pair of L-shaped outer plies, the intermediate plies comprise a pair of intermediate plies, and the intermediate plies are located between the foundation and respective ones of the outer plies on opposite lateral sides of the tongue; and
    the complementary chamfers extend completely across the intermediate plies and the pockets in a direction parallel to the tongue.

3. A structural member according to claim 1, wherein the outer plies are friction stir welded to the base of the foundation in two locations between the chamfers and lateral distal ends of the outer plies and the base.

4. A structural lug, comprising:
    a foundation formed from a metallic material and having a base, a tongue extending from the base, and pockets formed in the base on opposite sides of the tongue, each of the pockets having a chamfer on one end;
    outer plies formed from a metallic material and having a base portion secured to the foundation, the outer plies being spaced apart from each other and free of contact with the tongue;
    intermediate plies formed from a composite material comprising an adhesive-based resin with embedded fibers, base portions of the intermediate plies being located in the pockets between the base and the respective ones of the base portions of outer plies such that the base portions of the intermediate plies are flush with the base, said base portions of the intermediate plies having complementary chamfers to the chamfers of the pockets, the intermediate plies being bonded to the base and the tongue with adhesive, and the outer plies being fitted over and bonded to the intermediate plies to form outermost layers of the lug; and
    an aperture formed in and extending cylindrically and coaxially through the tongue of the foundation and upper portions of the outer plies, and the intermediate plies.

5. A structural lug according to claim 4, wherein the outer plies comprise a pair of L-shaped outer plies, the intermediate plies comprise a pair of intermediate plies, and the intermediate plies are located between the foundation and respective ones of the outer plies on opposite lateral sides of the tongue; and the complementary chamfers extend completely across the intermediate plies and the pockets in a direction parallel to the tongue.

6. A structural lug according to claim 4, wherein the tongue extends perpendicularly from a central portion of the base to bifurcate the foundation into two lateral portions, the outer plies are secured only to distal ends of the two lateral portions beyond the intermediate plies; and the intermediate plies are bonded to the base and to the tongue with adhesive, and the outer plies are fitted over and bonded to the intermediate plies and to distal portions of the base beyond the pockets to form outermost layers of the member.

7. A structural lug according to claim 4, wherein the outer plies are friction stir welded to the base of the foundation in two locations between the chamfers and lateral distal ends of the outer plies and the base; and the composite material acts as a self-bonding agent between the foundation and the outer plies.

8. A structural lug according to claim 4, wherein the outer plies are secured to the base of the foundation with mechanical fasteners between respective lateral distal ends of the intermediate and outer plies.

9. A structural lug, comprising:

a foundation formed from a metallic material and having a base, a tongue extending from the base, and pockets formed in the base on opposite sides of the tongue, each of the pockets having a chamfer on one end;

outer plies formed from a metallic material and having a base portion secured to the foundation, the outer plies being spaced apart from each other and free of contact with the tongue;

intermediate plies formed from a composite material comprising an adhesive-based resin with embedded fibers, base portions of the intermediate plies being located in the pockets between the base and the respective ones of the base portions of outer plies such that the base portions of the intermediate plies are flush with the base, said base portions of the intermediate plies having complementary chamfers to the chamfers of the pockets, the intermediate plies being bonded to the base and the tongue with adhesive, and the outer plies being fitted over and bonded to the intermediate plies to form outermost layers of the lug;

an aperture formed in and extending cylindrically and coaxially through the tongue of the foundation and upper portions of the outer plies, and the intermediate plies; wherein the outer plies comprise a pair of L-shaped outer plies, the intermediate plies comprise a pair of intermediate plies, and the intermediate plies are located between the foundation and respective ones of the outer plies on opposite lateral sides of the tongue;

the complementary chamfers extend completely across the intermediate plies and the pockets in a direction parallel to the tongue;

the tongue extends perpendicularly from a central portion of the base to bifurcate the foundation into two lateral portions, the outer plies are secured only to distal ends of the two lateral portions beyond the intermediate plies; and the intermediate plies are bonded to the base and to the tongue with adhesive, and the outer plies are fifed over and bonded to the intermediate plies and to distal portions of the base beyond the pockets to form outermost layers of the member.

10. A structural lug according to claim 9, wherein the outer plies are friction stir welded to the base of the foundation in two locations between the chamfers and lateral distal ends of the outer plies and the base.

11. A structural lug according to claim 9, wherein the outer plies are secured to the base of the foundation with mechanical fasteners between respective lateral distal ends of the intermediate and outer plies.

* * * * *